Nov. 20, 1945. E. H. LEHMAN 2,389,262
FRICTION SHOCK ABSORBING MECHANISM
Filed Nov. 8, 1943
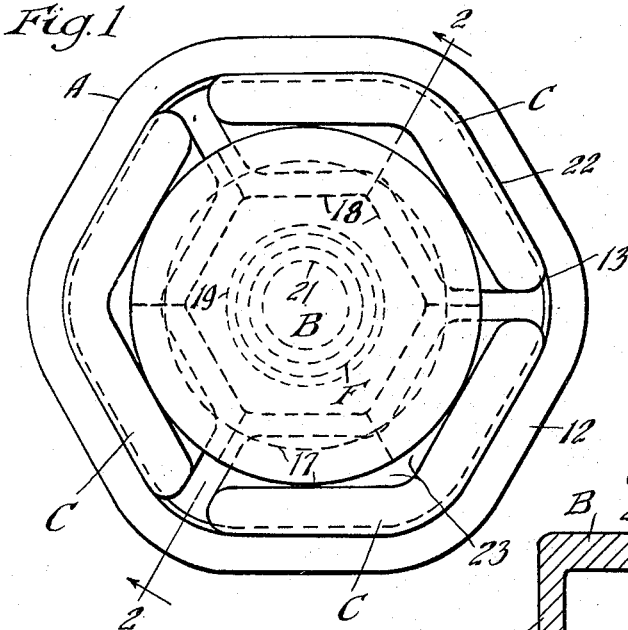
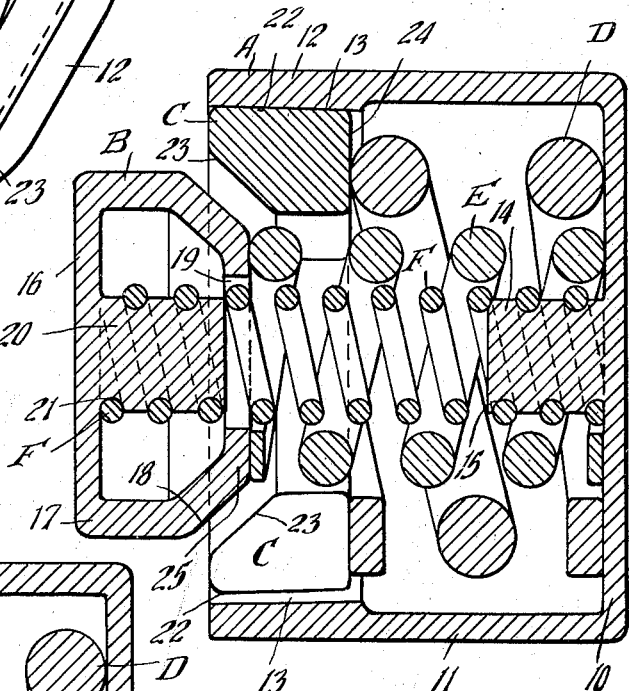
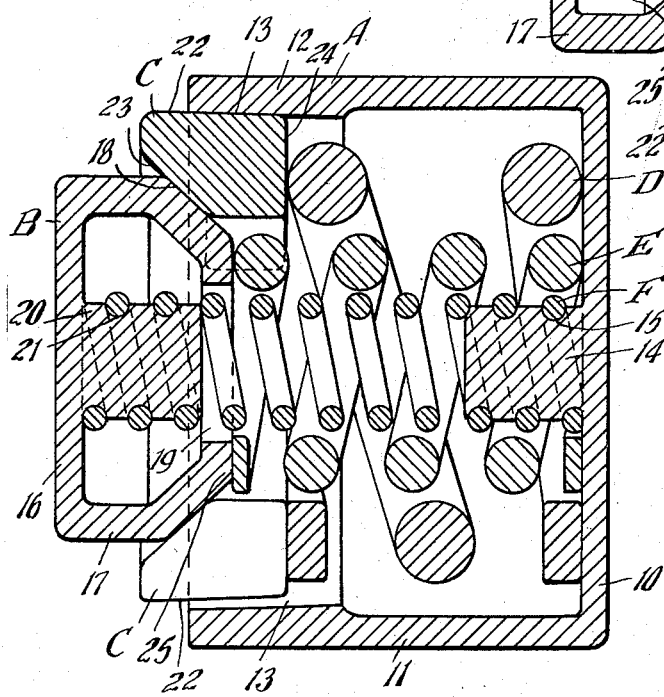
Inventor
Edward H. Lehman
By Henry Fuchs
Atty.

Patented Nov. 20, 1945

2,389,262

UNITED STATES PATENT OFFICE 2,389,262

FRICTION SHOCK ABSORBING MECHANISM

Edward H. Lehman, Chicago, Ill., assignor to W. H. Miner, Inc., Chicago, Ill., a corporation of Delaware Application November 8, 1943, Serial No. 509,452

6 Claims. (Cl. 267—9)

This invention relates to improvements in friction shock absorbing mechanisms for railway cars.

One object of the invention is to provide a friction shock absorbing mechanism comprising a friction casing; a pressure transmitting wedge block; shoes interposed between the wedge block and interior walls of the casing; and spring resistance means within the casing wherein the spring resistance includes a central spring element which is employed to anchor the wedge to the casing, thereby dispensing with the usual retaining bolt commonly employed for this purpose.

A more specific object of the invention is to provide a mechanism as set forth in the preceding paragraph, wherein the spring element, which is employed to anchor the wedge to the casing, is in the form of a coil threadedly connected to the wedge and casing.

Other objects of the invention will more clearly appear from the description and claims hereinafter following.

In the drawing forming a part of this specification, Figure 1 is a top plan view of a friction shock absorbing mechanism embodying my invention. Figure 2 is a longitudinal sectional view, corresponding to the line 2—2 of Figure 1. Figure 3 is a view, similar to Figure 2, illustrating the manner of assembling the parts of the mechanism.

My improved shock absorbing mechanism comprises broadly a friction casing A; a wedge block B; three friction shoes C—C—C; and a spring resistance including three spring elements D, E, and F, the spring element F serving also as a retaining element to anchor the wedge to the casing.

The friction casing A, which is preferably of hexagonal, interior and exterior, transverse cross section, is open at the front end and closed by a transverse wall 10 at the rear end. The six side walls of the casing, which are indicated by 11—11, are thickened at the open end of the casing, as most clearly shown in Figures 2 and 3, said thickened wall portions providing the friction shell section proper of the casing. The friction shell section, which is indicated by 12, presents six longitudinally extending flat faces 13, which converge inwardly of the casing. Each set of two adjacent faces 13—13 together define a friction surface of V-shaped transverse section. The rear wall 10 of the casing is provided with a central, inwardly projecting boss 14, of cylindrical form, having an exterior spiral groove 15 extending from end to end thereof, forming, in effect, an external screw thread.

The wedge B is in the form of a hollow block of hexagonal, interior and exterior cross section having a flat, transverse, front end wall 16. The side walls of the block, which are indicated by 17, have inwardly converging, rear, end sections which converge inwardly and present six flat, exterior wedge faces 18—18, which converge inwardly, each set of two adjacent faces 18—18 together defining a wedge face of V-shaped, transverse cross section. The hollow wedge block is provided with an opening 19 at the inner end thereof for a purpose hereinafter pointed out. Rearwardly projecting from the inner side of the front wall 16 is a central boss 20 of cylindrical cross section having an exterior spiral groove 21 extending from end to end thereof. The boss 20 is in axial alignment with the boss 14 of the casing and of the same diameter and the spiral groove thereof is of the same pitch as the groove 15.

The friction shoes C, which are three in number, are interposed between the wedge faces 18 of the block B and the friction surfaces 13 of the casing. Each shoe has an outer friction surface 22 of V-shaped, transverse section, engaging with one of the V-shaped friction surfaces of the casing. On the inner side, each shoe has a wedge face 23 of V-shaped, transverse section, engaging with and correspondingly inclined to one of the V-shaped wedge faces formed by two adjacent faces 18—18 of the block B. At the inner end, each shoe has a flat, transverse face 24 functioning as a spring abutment.

The three spring elements D, E, and F, which form the spring resistance of the mechanism, are disposed within the casing A. The spring element F, which forms the inner coil of the spring resistance and extends through the opening 19 into the hollow wedge B, has the front and rear end portions thereof threaded respectively on the boss 20 of the wedge B and the boss 14 of the casing A, the coils of said front and rear end portions being seated in the grooves 21 and 15. The pitch of the spiral grooves 21 and 15 preferably corresponds to the pitch of coils of the spring in its normal expanded condition. As will be evident by its threaded connection with the bosses of the casing and wedge, the spring F acts to anchor the wedge to the casing and limit outward movement of the wedge. The spring element D, which is relatively heavy, forms the outer coil of the spring resistance and yieldingly opposes inward movement of the shoes, being interposed between the end wall 10 of the casing and the flat inner ends of the shoes C—C—C. The spring element E, which is lighter than the spring D and heavier than the spring F, forms the intermediate coil of the spring resistance and yieldingly opposes inward movement of the wedge B, having its front and rear ends bearing respectively on the inner end of the wedge B and the back wall 10 of the casing, the wedge being provided with a flat wall portion 25 with which the front end of the spring engages. The wall 25 surrounds and defines the opening 19 of the wedge. The spring F, which connects the wedge to the casing, also opposes inward movement of the wedge B, the portion thereof between the bosses 14 and 20 being active to accomplish this result.

In assembling the mechanism, the spring E is first threaded on the boss 14 of the casing. The outer springs D and E and the shoes C are then placed within the casing. After the parts have been thus far assembled, the shoes are forced inwardly of the casing against the resistance of the spring D until they reach a predetermined position, this predetermined position being such that the shoes are entirely clear of engagement with the wedge during the operation of assembling the latter with the other parts of the mechanism. While the shoes are held in the predetermined position by a suitable holding tool, the wedge B is applied by screwing the boss 14 thereof into the front end of the spring F. The holding tool is then disengaged from the shoes, permitting the spring D to expand and force the shoes outwardly against the wedge B which has its movement limited by the anchoring spring F. In the completely assembled condition of the mechanism, the wedge B is locked against rotation with respect to the casing by the shoes C—C—C, the interengaging, V-shaped, friction surfaces of the shoes and casing preventing rotary displacement of the shoes with respect to the casing and the interengaging V-shaped wedge faces of the shoes and wedge, in turn, preventing rotary displacement of the wedge with respect to the shoes. By this arrangement, there is no danger of the wedge becoming disconnected through accidental unscrewing of the spring F from the bosses 14 and 20 of the casing and wedge.

The operation of my improved shock absorbing mechanism is as follows: Upon compression of the same the wedge is forced inwardly of the casing, spreading the shoes C—C—C apart and carrying the same inwardly along the friction surfaces of the casing, against the resistance of the spring D. During this action, inward movement of the wedge is resisted jointly by the springs E and F. The desired shock absorbing capacity is thus provided by combined spring and frictional resistance.

In release of the mechanism, the springs D, E, and F act to restore all of the parts to the normal full release position shown in Figure 2, outward movement of the wedge being limited by the anchoring spring E and outward movement of the shoes C—C—C, in turn, being limited by the wedge.

I claim:

1. In a friction shock absorbing mechanism the combination with a friction casing; of a friction clutch slidably telescoped within the casing, said clutch including a wedge member and friction shoes surrounding said wedge member, said shoes having interlocking engagement with the wedge and casing to prevent relative rotation of the casing and wedge; and spring means within the casing yieldingly opposing inward movement of the clutch, including a coil spring element having the coils at the opposite ends thereof in threaded engagement with the casing and wedge member to anchor the wedge member to the casing.

2. In a friction shock absorbing mechanism, the combination with a friction casing of hexagonal, interior, cross section having longitudinally extending, interior, friction surfaces of V-shaped, transverse section; of a plurality of friction shoes having friction surfaces of V-shaped, transverse section interengaged with the V-shaped surfaces of the casing; a central wedge block, said block and shoes having interengaged wedge faces of V-shaped, transverse section; and spring resistance means within the casing yieldingly opposing inward movement of said shoes and wedge block, including a central coil spring element having threaded engagement with the block and casing, respectively, to anchor the block to the casing.

3. In a friction shock absorbing mechanism, the combination with a friction casing; of a wedge pressure transmitting member; friction shoes having sliding frictional engagement with the casing and wedging engagement with said member; and spring means resisting inward movement of the wedge member and shoes, including a coil spring element having the coiled portions at opposite ends thereof in threaded engagement with said member and casing to anchor said member to the casing and limit outward movement of said member with respect to the casing.

4. In a friction shock absorbing mechanism, the combination with a friction casing closed at the one end by an end wall and open at the other end; of an inwardly projecting, central boss on said wall, said boss being externally threaded, said casing having interior, friction surfaces at the open end thereof; a friction clutch telescoped within the open end of the casing and having sliding frictional engagement with the friction surfaces thereof, said clutch including a wedge block and friction shoes in wedging engagement with each other, said wedge having an inwardly projecting, exteriorly threaded, central boss; and spring means opposing inward movement of the clutch, including a central coil spring element having the coiled portions at opposite ends thereof engaged with the threads of said bosses, respectively, to anchor the block to the casing.

5. In a friction shock absorbing mechanism, the combination with a friction casing closed at the one end by a transverse wall and open at the other end, said casing having interior friction surfaces at said open end; of a threaded control boss on said wall; a friction clutch telescoped within the casing and having sliding frictional engagement with the friction surfaces thereof, said clutch including a pressure transmitting wedge and friction shoes in wedging engagement with said wedge; a threaded central boss on said wedge; and spring means within the casing yieldingly opposing inward movement of the clutch, including a central coil spring having the coiled portions at opposite ends thereof in threaded engagement with said bosses, respectively.

6. In a friction shock absorbing mechanism, the combination with a friction casing closed at one end by a transverse wall and open at the other end; of an inwardly projecting, central boss on said wall, said boss having an exterior thread of spiral groove formation; a friction clutch telescoped within the casing, said clutch including a central wedge block and friction shoes surrounding said block, said shoes having interlocking engagement with the wedge and casing to hold said wedge against rotation with respect to the casing; an inwardly projecting boss on said wedge, said boss having an exterior thread of spiral groove formation and spring means within the casing yieldingly opposing inward movement of said clutch, including a central coil spring element having the coiled portions at opposite ends thereof interlocked within the spiral grooves of said bosses, respectively.

EDWARD H. LEHMAN.

CERTIFICATE OF CORRECTION.

Patent No. 2,389,262.                                                November 20, 1945.

EDWARD H. LEHMAN.

It is hereby certified that error appears in the printed specification of the above numbered patent requiring correction as follows: Page 2, second column, line 44, claim 5, for "control" read --central--; and that the said Letters Patent should be read with this correction therein that the same may conform to the record of the case in the Patent Office.

Signed and sealed this 5th day of February, A. D. 1946.

(Seal)

Leslie Frazer
First Assistant Commissioner of Patents.